M. GRAY & B. HARRIS.
VEHICLE TIRE.
APPLICATION FILED AUG. 28, 1916.

1,222,283.

Patented Apr. 10, 1917.

Inventors
Max Gray
Benjamin Harris

By their Attorney
Albert Bersin

UNITED STATES PATENT OFFICE.

MAX GRAY AND BENJAMIN HARRIS, OF NEW YORK, N. Y.

VEHICLE-TIRE.

1,222,283.

Specification of Letters Patent. Patented Apr. 10, 1917.

Application filed August 28, 1916. Serial No. 117,246.

*To all whom it may concern:*

Be it known that we, MAX GRAY and BENJAMIN HARRIS, citizens of the United States, and residents of New York, in the county of New York and State of New York, have invented certain new and useful Improvements in Vehicle-Tires, of which the following is a specification.

The object of this invention is to provide a tire which will resist puncture and attrition and which will not skid on wet surfaces.

We obtain this object by providing detachable corrugated armor segments which fit into corresponding recesses in the outer shoe of the tire and are held in place by means of screws passing through holes in the outer shoe which are screwed into threaded holes in a locking or anchor plate placed on the inside of the shoe.

One of the features of our invention is that the outer armor is divided into a number of segments around the circumference, thereby insuring independent action of each segment and resiliency to the tires.

Other features of our device will be apparent from the detailed description and the accompanying drawing forming a part of this specification, in which similar numerals indicate corresponding parts in all the figures and in which—

Figure 2:
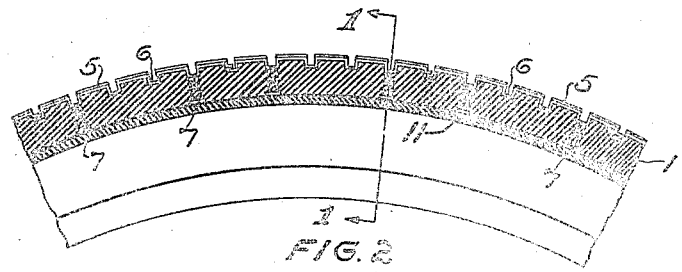
Figure 3:
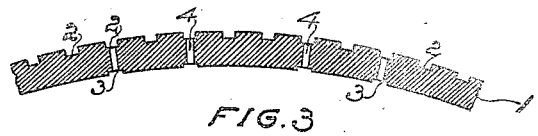
Figure 1:
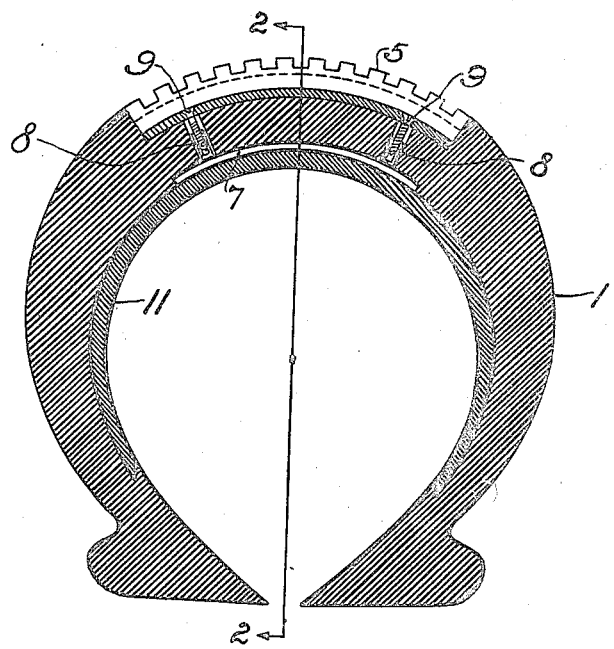
Figure 4:
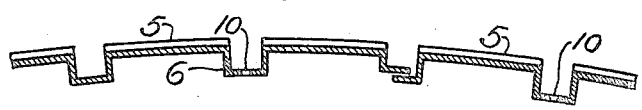

Figure 1 is a cross section of a tire; Fig. 2 is a longitudinal section of a portion of a tire and taken on line 2—2 of Fig. 1; Fig. 3 is a longitudinal section of the outer shoe, and Fig. 4 is a longitudinal section showing portions of two segments of the protecting armor.

Referring to the drawings, the outer shoe 1 is provided with recesses 2 in its outer surface and recesses 3 in its inner surface as shown in Fig. 3, and both sets are spaced over the full length of their respective circumferences. The channel portions 6 of the armor 5 fit into the recesses 2 in the shoe 1, while the curved anchor plates 7 fit into the recesses 3 in the shoe 1. The plates 7 are provided with hollow internally threaded pins 8 which fit into the holes 4 in the shoe 1. The armor 5 is held in place by means of the screws 9 which pass through the holes 10 in the armor 5 and are then screwed into the threaded holes in the pins 8. The armor 5 is divided into a number of segments thus permitting the tire to be resilient.

It will be noted that the armor is prevented from creeping along the circumference of the shoe by means of the grooves 2, the pins 8 and the anchor plates 7.

After all the segments of armor are attached, the inner casing 11, preferably made of rubber is inserted into the recess provided in the inside of the shoe 1, as is clearly shown in Fig. 1, thus providing a smooth surface for the inner or pneumatic tube.

Having thus described our invention, we claim as new and wish to secure by Letters Patent:

1. In a vehicle tire, the combination of an outer shoe having a series of recesses in its outer surface and a series of recesses in its inner surface, a corrugated tread, encircling said outer shoe having projections in its under surface adapted to fit into the recesses in the outer surface of the outer shoe, a series of anchor plates adapted to fit into the recesses in the inner surface of the shoe and means for attaching the corrugated tread to said anchor plates.

2. In a vehicle tire, the combination of an outer shoe having a series of recesses in its outer surface, a series of recesses in its inner surface and a series of radial holes, a corrugated tread encircling said outer shoe having projections in its under surface adapted to fit into the recesses in the outer surface of the outer shoe, a series of anchor plates adapted to fit into the recesses in the inner surface of the shoe, threaded pins rigidly fixed to said anchor plates adapted to fit into the radial holes in the outer shoe and means for attaching the corrugated tread to said anchor plates, comprising screws passing through holes in said tread and engaging with said threaded pins.

3. In a vehicle tire, the combination of an outer shoe having a series of recesses in its outer surface and a series of recesses in its inner surface, a corrugated tread encircling said outer shoe consisting of a plurality of independent sections, each of said sections having projections in its under surface adapted to fit into the recesses in the outer surface of the outer shoe, a series of anchor plates adapted to fit into the recesses in the inner surface of the shoe and means for attaching the corrugated tread to said anchor plates.

4. In a vehicle tire, the combination of an outer shoe having a series of recesses in its outer surface and a series of recesses in its inner surface, a metal tread encircling said outer shoe having projections in its under surface adapted to fit into the recesses in the outer surface of the outer shoe, a series of anchor plates adapted to fit into the recesses in the inner surface of the shoe and means for attaching the metal tread to said anchor plates.

5. In a vehicle tire, the combination of an outer shoe having a series of recesses in its outer surface and a series of recesses in its inner surface, a metal tread encircling said outer shoe consisting of a plurality of independent sections, each of said sections having projections in its under surface adapted to fit into the recesses in the outer surface of the outer shoe, a series of anchor plates adapted to fit into the recesses in the inner surface of the shoe and means for attaching the metal tread to said anchor plates.

6. In a vehicle tire, the combination of a resilient shoe having a series of recesses in its outer surface and a series of recesses in its inner surface, a removable tread having projections in its under surface adapted to fit into said recesses in the outer surface of the shoe, anchoring members located on the inner surface of the shoe, having projections adapted to fit into the recesses in the inner surface of said shoe, and means for attaching the tread to said anchoring members.

7. In a vehicle tire, the combination of an outer shoe having a continuous peripheral depression in its outer surface and a series of recesses in its inner surface, a removable tread encircling said outer shoe adapted to fit into said depression in the outer shoe, anchoring members located on the inside of said shoe having projections adapted to fit into the recesses in the inner surface of said shoe, and means for attaching the tread to said anchoring members.

Signed at New York, in the county of New York, and State of New York, this 25th day of August, A. D. 1916.

MAX GRAY.
BENJAMIN HARRIS.